Feb. 21, 1956
J. H. TAYLOR
2,735,348
PLOW CONSTRUCTION
Filed Aug. 28, 1951
4 Sheets-Sheet 1
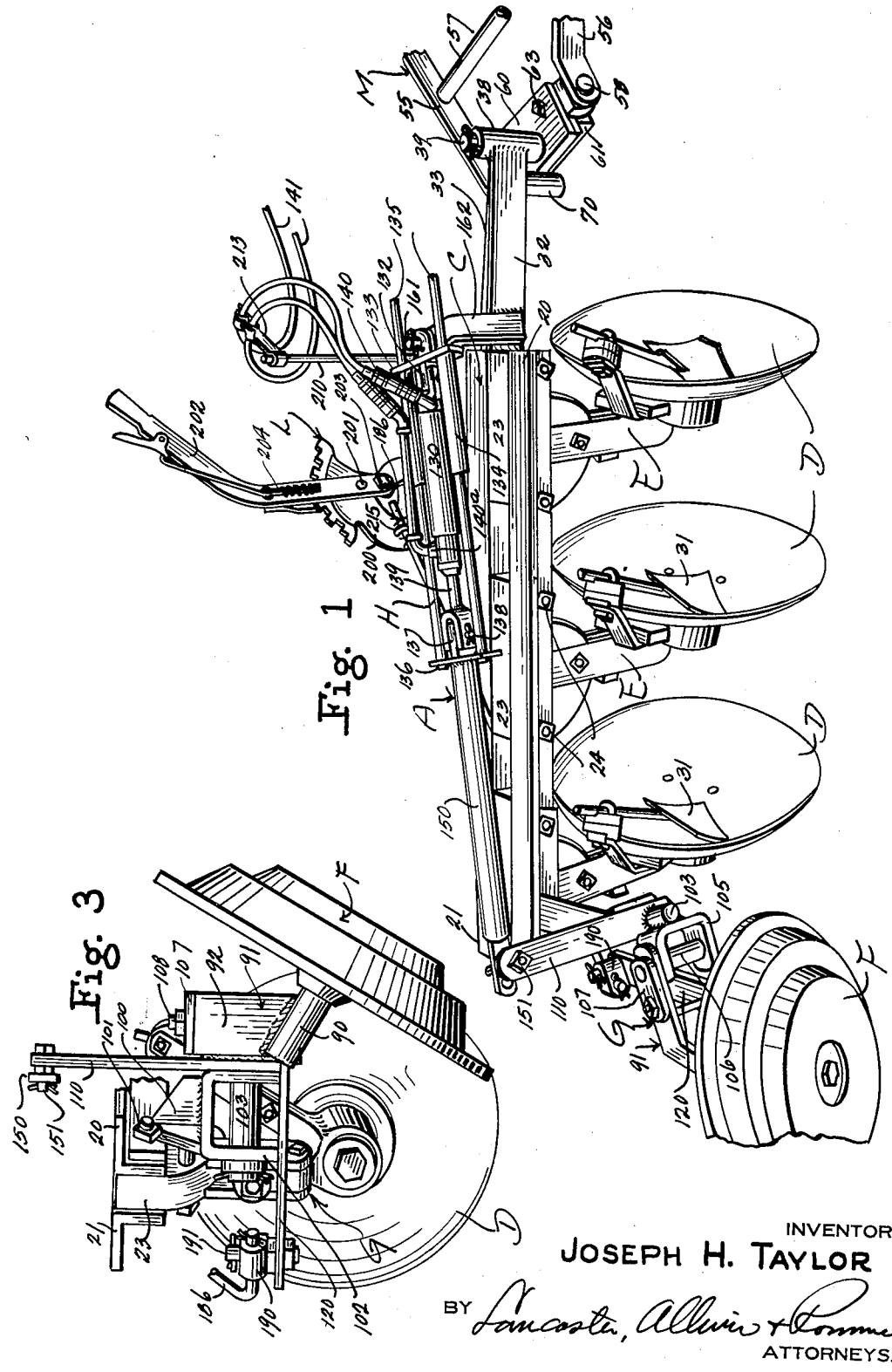
INVENTOR.
JOSEPH H. TAYLOR
BY Lancaster, Allwin & Rommel
ATTORNEYS.

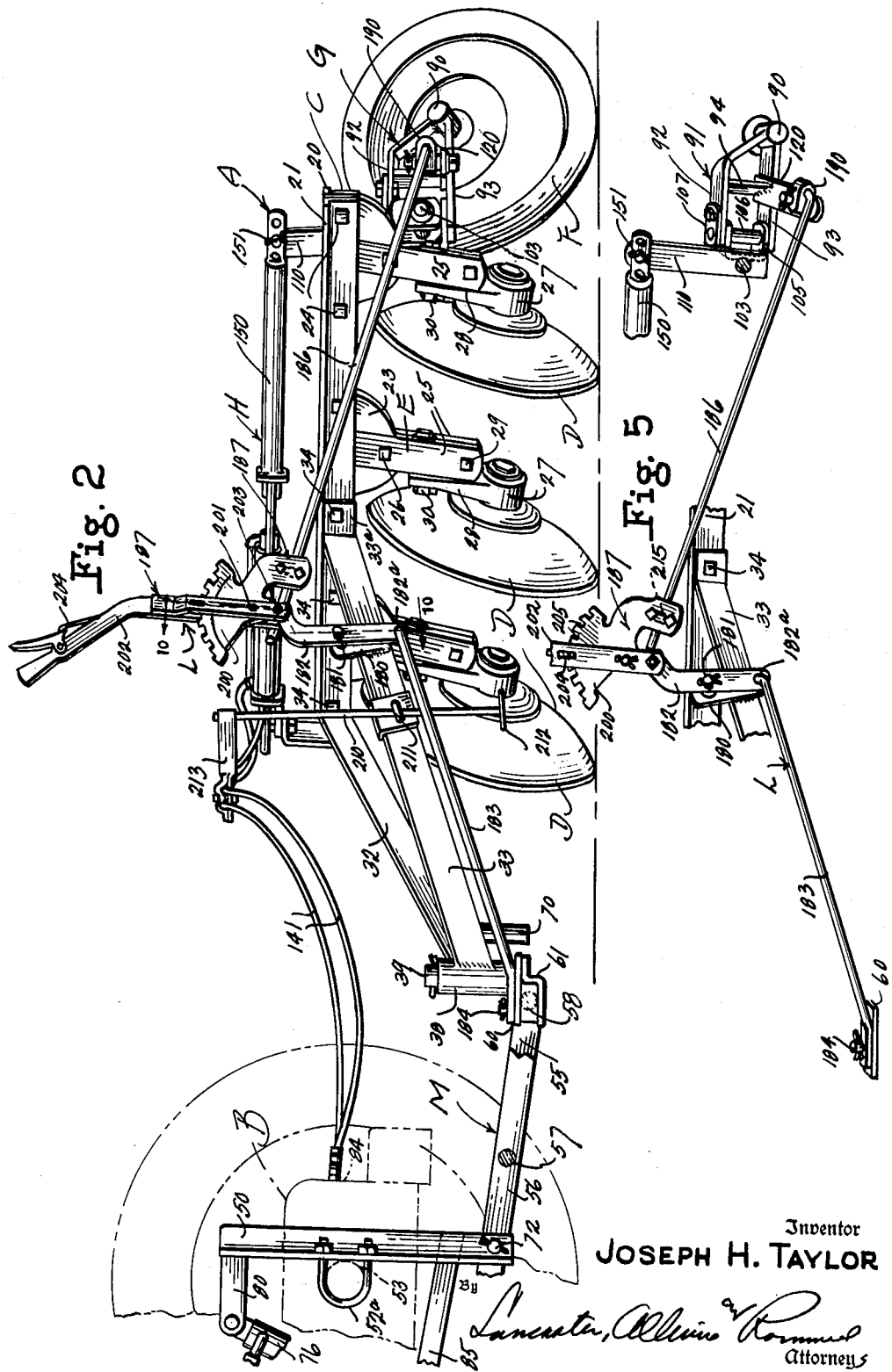

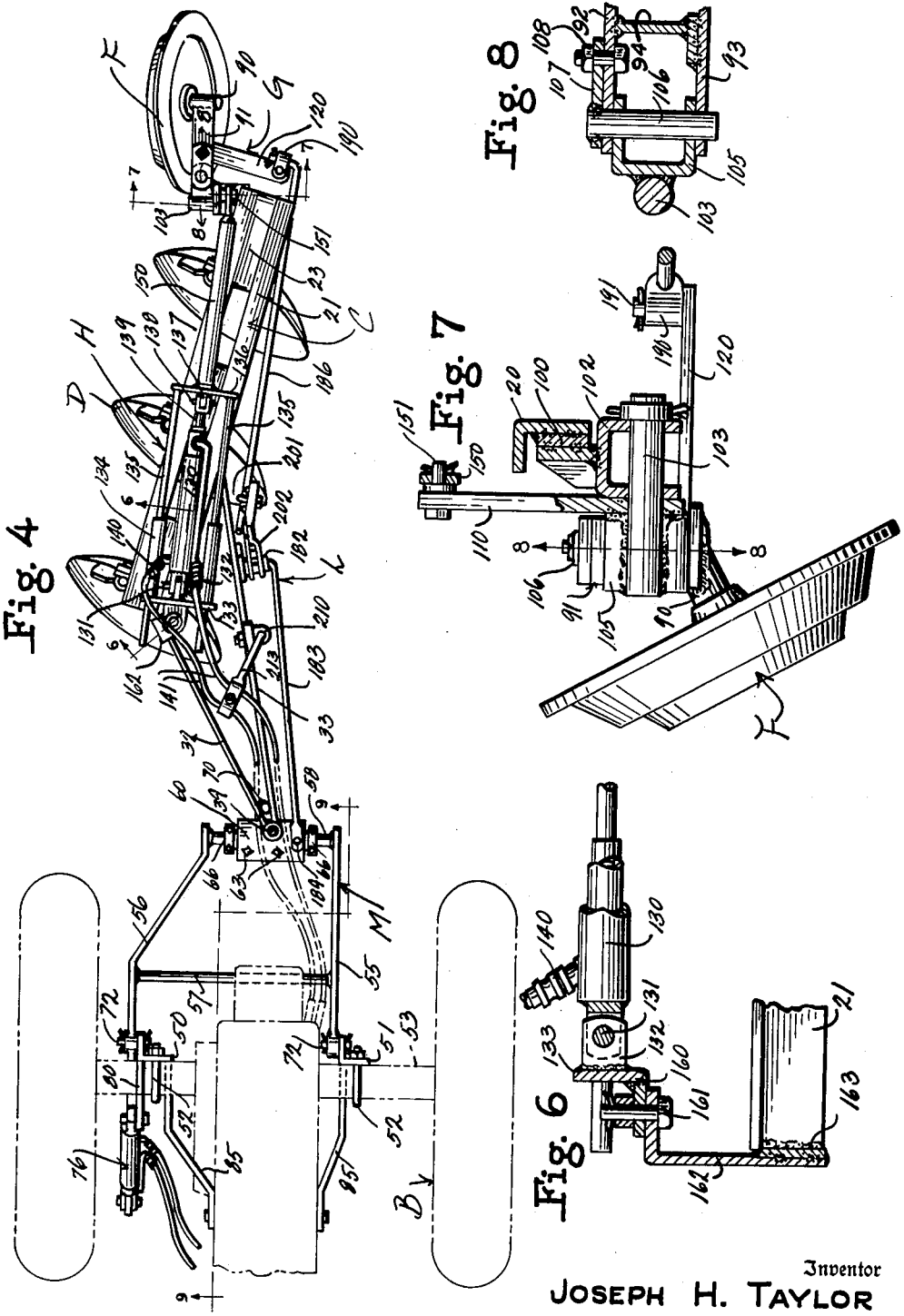

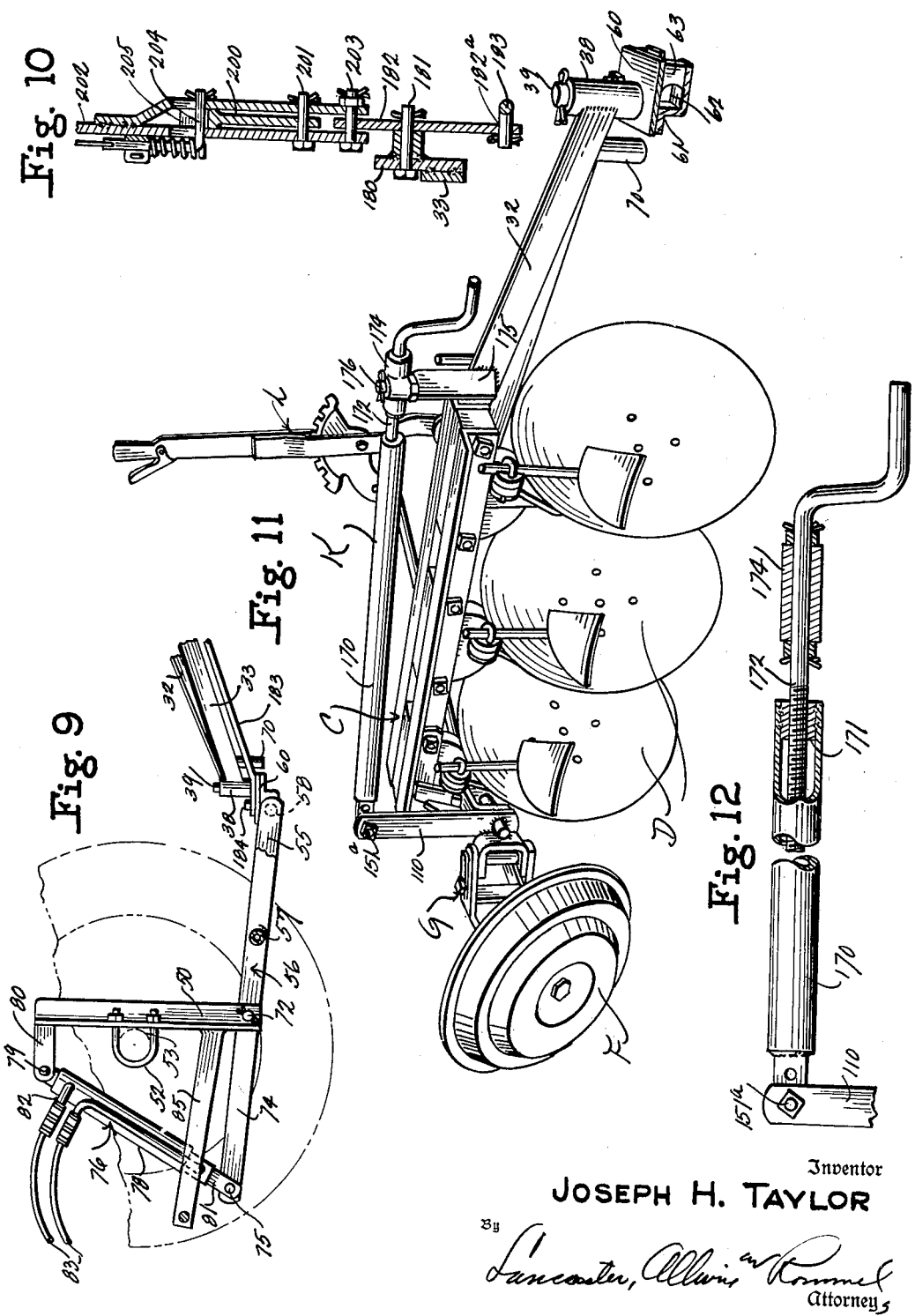

United States Patent Office 2,735,348
Patented Feb. 21, 1956

2,735,348

PLOW CONSTRUCTION

Joseph H. Taylor, Athens, Tenn.

Application August 28, 1951, Serial No. 243,954

2 Claims. (Cl. 97—47.1)

This invention relates to improvements in plow constructions.

The primary object of this invention is the provision of an improved disc type plow construction having a durable assembly of parts which may be easily handled for positive soil penetration by the discs under such conditions that the discs will have controlled and proper plowing depth and furrow width.

A further object of this invention is the provision of a relatively simple type of disc plow construction which can be easily and readily hitch connected to a tractor, and manually and automatically controlled to provide optimum plowing.

A further object of this invention is the provision of an improved disc type plow, the draft of which is connected by an improved hitch assembly at the center of the tractor, and the details of which are so assembled as to minimize side draft and provide for automatic implement steering during turning movements of the tractor.

A further object of this invention is the provision of an improved plow having some of the mounting and steering characteristics of the plow of my U. S. Patent 2,704,496, dated March 22, 1955, embodying certain improvements thereover in a means for adjustably manipulating the position of the implement during turning movements of the tractor to provide furrows of proper width.

A further object of this invention is the provision of an improved hydraulic means for a plowing implement for controlling plowing depth.

Other objects and advantages of the invention will appear in the accompanying drawings, forming a part of this specification, and wherein similar reference characters designate corresponding parts throughout the several views.

Figure 1 is a perspective view of the improved plow construction showing a portion of the hitch thereof.

Figure 2 is a left side elevational view of the improved plow construction showing a hitch connection of the same to a tractor.

Figure 3 is a view of the rear of the plow construction looking towards the front thereof, and more particularly illustrating the mounting features of a furrow wheel.

Figure 4 is a plan view of the plow construction, showing various features thereof and also a hitch means for connecting it to a tractor.

Figure 5 is a perspective view of the adjustable connecting means mounted upon the plow construction for the lateral movement of the furrow wheel, said means being adapted for connection with some non-laterally movable portion connected to the tractor, which in the present instance is the hitch.

Figures 6, 7 and 8 are cross-sectional views taken substantially on their respective lines 6—6; 7—7 and 8—8, shown in Figure 4 of the drawings.

Figure 9 is a side elevation of certain details of the hitch, the view being taken substantially on the line 9—9 of Figure 4.

Figure 10 is a vertical cross-sectional view taken through the rocking differential arm of the automatic steering means for the furrow wheel, the view being taken substantially on the line 10—10 of Figure 2.

Figure 11 is a right side perspective view of the plow with certain modifications.

Figure 12 is a fragmentary side elevation, partly in section, of a manually actuated lifting and lowering means for the furrow wheel.

In the drawings, wherein for the purpose of illustration are shown preferred and modified forms of the invention, the letter A may generally designate the improved plow construction, adapted for connection to a tractor B. The plow construction A includes a frame C having plow discs D of any approved number mounted, each thereon by means E. A furrow wheel construction F is provided, having improved means G for the mounting thereof upon the plow frame C. Improved hydraulic means H is provided for controlling the lifting and lowering movements of the furrow wheel F, for the purpose of controlling plowing depth. In lieu thereof a manual means K shown in Figure 11 may be used. Connecting means L, which is both manually and automatically actuated, connects the hitch mechanism M of the tractor with the mounting means G of the furrow wheel F for lateral movements of the furrow wheel in order to properly control furrow width under substantially all plowing conditions.

The frame structure C of the improved plow preferably comprises a pair of angle pieces 20 and 21 the depending leg portions of which are bolted in spaced parallel relation by certain blocks 23 used for connecting the plow disc bearing frames thereto. The bolts are indicated at 24 in Figure 2 of the drawings, and elsewhere. Any desired number of the blocks 23 may be provided, depending upon the number of plow discs it is intended to use upon the plow frame. These parts are of metal and are quite heavy.

The discs D and the mounting thereof are specifically detailed in my co-pending application Serial 119,731 filed October 5, 1949. Suffice to say that the blocks 23 are recessed at opposite sides for receiving depending legs 25 for each block, which may be bolted to the blocks at 26. The discs operate upon anti-friction bearings mounted within the adjustable disc bearing housing 27. The latter is provided with an upwardly extending arm portion 28 having a flange extending laterally between the supporting legs 25 and being bolted thereto at 29. This bolt 29 really forms a pivot connection to enable the tilt of the disc to be adjusted and the adjustment is held and maintained by the bolt means 30 shown in the drawings, and more specifically described in my co-pending application above mentioned.

Scraper means 31 of a conventional nature may be secured to the plow discs and mounting thereof for a purpose well understood in the art.

An improved tongue or draw bar construction is provided as part of the frame work of the plow, comprising a pair of bars 32 and 33 arranged in V-shaped association; the former being the shorter and having a horizontal attaching flange portion adapted to align alongside of the leg of the angle piece 21, to which it is bolted by bolts 34.

The other bar or tongue portion 33 has its rear end flanged at 33ᵃ and bolted by one of the bolts 34 to the angle 21, as shown in Figure 2. The V-shaped tongue construction has its axis disposed at an acuate angle to the longitudinal center line of the frame of the plow construction, as designated by the elongated angle pieces 20 and 21, as shown in Figure 4, so that the frame angles will lie at an acute angle to the longitudinal center line of the tractor during draft movement thereof. At the juncture of the bar portions 32 and 33 there is provided a welded sleeve 38 having a vertical passageway adapted to receive a king pin 39 forming a part of the hitching mechanism M.

Referring to the hitch mechanism M, the same may vary as to construction, to suit various types of tractors and draft vehicles. For the type shown, the hitch mechanism M preferably comprises a pair of vertically positioned supporting members 50 and 51, of structural steel angle material; one flange portion of which is bolted as at 52 to the axle 53 of the tractor B. These vertical supporting angles 50 and 51 at their lower ends, below axle 53 pivotally support, on the other flanges thereof, rearwardly extending connecting links 55 and 56. Intermediate their ends the links are connected by means of a horizontal brace rod 57 welded thereto, and at their outer or rear ends said links 55 and 56 are connected by a shorter connecting draw bar 58 which furnishes the draft connection of the plow with the hitch. The link 56 is laterally inturned.

The king pin 39 above mentioned is mounted upon a hitching plate 60 which is rotatably mounted upon the bar 58. Various means may provide such a mounting, such as the use of welded angle pieces 61 defining a recess or passageway 62 to receive draw bar 58; spacer blocks and bolt means 63 being provided to facilitate quick connection and disconnection of the hitching plate with the draft bar 58. Movement limiting straps 66 may be placed upon the bar 58 to limit the endwise movement of the hitching plate and yet permitting the same to pivot upon the draft bar 58 to facilitate lifting and lowering of the plow frame at its front end.

It will be noted that the king pin 39 furnishes a vertical pivot axis so the plow may swing from side to side during turning of the tractor. A stop post 70 is welded between the bars 32 and 33 at the front ends thereof adjacent to the pivot 39 and depending as shown in Figure 2 below the plane of the hitch plate 60 so as to contact the latter in order to limit the degree to which the plow can swing laterally, to right or left, during tractor turns.

Referring again to the tractor hitch M the links 55 and 56 are pivotally connected by detachable horizontal pivot pins 72 to the lower ends of the supporting standards or uprights 50 and 51. The link 56 extends forwardly beyond the pivot pin 72 and provides an arm portion 74 (see Figure 9) which has a pivoted connection 75 at its forward end with hydraulic mechanism 76 for raising and lowering the link 56. Through this means the hitch linkage is raised and lowered for the purpose of raising and lowering the front end of the plow structure A.

The hydraulic mechanism 76 preferably comprises a cylinder portion 78 pivoted at 79 upon laterally extending rigid arm 80 projecting forwardly from the top of the standard 52, as shown in Figure 9. The pivoted cylinder 78 has a piston (not shown) operating therein to which is attached a piston rod 81, the latter being pivotally connected at 75 to the forward end of the arm 74. Nozzle stubs 82 are provided at opposite ends of the cylinder, and of course at opposite sides of the piston, to which flexible hose 83 may be connected. The hose 83 leads to the hydraulic pumping mechanism 84 of the tractor. The operation of this hydraulic mechanism is known to those skilled in the art and needs no further description. The lower ends of the standards 51 and 52 may be braced by forwardly and upwardly extending brace bars 85 shown in Figures 2 and 4 of the drawings. They are connected to the chassis frame of the tractor.

The furrow wheel F and its mounting means G possess many characteristics of the furrow wheel shown in my above identified co-pending application. The furrow wheel F is heavily weighted and is provided with an axle 90 preferably mounted in an anti-friction bearing in the hub of the furrow wheel F. The axle 90 is provided with a forwardly extending arm or yoke structure 91 consisting of an upper arm portion 92 and a lower arm portion 93. Intermediate their ends arms 92 and 93 may be reinforced, as to spacing, by means of a welded cross piece 94. The proximate ends of the arms 92 and 93 are directly welded to the axle 90.

The main supporting bracket 100 (see Figure 3) for the mounting of the furrow wheel construction F is connected to the right hand angle frame piece 20; being bolted thereto as at 101, and depending therefrom. At its lower end it has a supporting yoke 102 for rotatably supporting the horizontal pivot pin 103. This horizontal pivot pin 103 has welded thereto a yoke 105 of C-shaped formation (see Figure 8), the leg portions of which support a vertical pivot pin 106. The pivot pin 106 is welded or otherwise secured to a strap 107 which may be bolted at 108 upon the main yoke arms 92 of the furrow wheel. The pin 106 depends through openings in the yoke arms 92 and 93 and through suitable openings in the legs of the yoke 105 as shown in Figure 8. The legs of the yoke 105 closely abut the inside surfaces of the end furrow yoke arms 92 and 93, as shown in Figure 8, so that upon turning of the end pin 103 the yoke 91 will be lifted and lowered for lifting and lowering of the furrow wheel F as will readily be apparent.

The yoke 105 has an upwardly extending arm 110 welded thereto. It may be welded to the pin 103 also. To it may be connected hydraulic means H or manual means K in order that the furrow wheel may be lifted or lowered upon the axis of the pin 103 in order to regulate furrow depth.

The pin 103 may be detachable from the yoke 102 as shown in Figure 7.

As shown in Figure 5 the furrow wheel yoke 91 may have a rigidly connected transversely extending arm 120, projecting towards the left side of the plow frame, for connection to the automatic steering means L. It is through the arm 120 that the angle of the furrow wheel F may be changed so as to vary the width of the furrow being cut, and to enable the plow to travel properly when the tractor is making a turn, for plowing furrows of proper shape and width.

Referring to the hydraulic means H for lifting and lowering the furrow wheel F, the same is located over the main frame angles of the plow, in position for ready access. The hydraulic cylinder 130 is provided with a clevis at its forward end swivelly connected at 131 to a rearward extending flange 132 of a cylinder guide assembly. More specifically it is connected to a transverse end frame portion 133 which has sleeves 134 rigidly connected therewith and extending rearwardly at each side of the cylinder 130 for receiving slide rods 135 therein. The latter are connected upon a cross bar 136 which has a stub extension 137 providing a support for a swivel pin 138 which is connected to the piston rod 139 of the hydraulic cylinder and piston assembly. The cylinder 130 has a piston (not shown) operating therein and the cylinder 130 is provided with nozzle connections 140 at opposite ends thereof to which flexible fluid hose lines 141 are attached. The piston connected cross piece 136 has a rearwardly extending rod portion 150 swivelly connected at 151 to the upper end of the standing furrow wheel arm 110 as shown in Figure 1. A number of openings are provided for such connection. The cylinder guide assembly portion 133 is provided with a horizontal welded piece 160 (see Figure 6) pivoted at 161 to the upper end of a bracket 162. The latter is welded at 163 to the frame piece 21.

In lieu of the hydraulic mechanism H I may employ manual mechanism K for raising and lowering the furrow wheel F. This is best shown in Figures 11 and 12 of the drawings and includes a cylinder 170 swivelly connected at 151ᵃ to the upper end of the furrow wheel arm 110. The cylinder 170 is provided with an internal nut 171 threadably receiving a link adjusting rod 172. The latter is rotatably supported in a bearing sleeve 174 mounted upon a bracket arm 175 welded or otherwise secured to the plow frame. The sleeve 174 may have a swivel pin mounting at 176.

Referring now to the steering connection between the mounting means of the furrow wheel F and the tractor hitch M, the same is provided for the purpose of laterally steering the furrow wheel F during turning of the tractor, and for other purposes which will be apparent.

Preferably upon the tongue portion 33 I weld a strap piece 180 for supporting a substantially horizontal pivot pin 181 upon which a rocker arm 182 is pivoted between its ends. The rocker arm 182 is upstanding and its lower end is pivotally connected at 182ª to a forwardly extending connecting rod 183. The latter is pivotally connected at 184 upon the hitch plate 60, spaced to the left of the pivot axis of the king pin 39. The upper end of the rocker arm 182 at the opposite side of the pivot 181, also has a rearwardly extending connecting rod 186 pivotally connected thereto by a means 187. At its rear end the connecting rod 186 has a steering swivel block 190 within which it is pivoted. The block 190 has a vertical pivot connection 191 upon the outer end of the furrow wheel steering arm 129.

Referring now to the means 187 the same includes both initial adjusting means provided to lengthen the distance between the actual pivot of the connecting rod 186 with the arm 182 and its rear pivot connection with the swivel block 190 and it also has a manual ratchet type of adjustment.

This is accomplished through the provision of a bracket arm 200 having a U bolt 215 thereof adjustably connected upon the forward end of the connecting rod 186. Thru this U bolt connection the length of the rod 186 can be extended between the actual pivot connection on the rocker arm 182 and the swivel connection at block 190, and of course this will vary the position of the steering arm 129 and the angle of the wheel F. The bracket 200 has pivoted thereon, at 201, a shift lever 202. Spaced from the pivot 201 said shift lever 202 is pivoted at 203 with the upper end of the rocker arm 182. The shift lever 202 is provided with a handle actuated pawl mechanism 204 cooperating in the notches of a ratchet segment 205 forming part of the bracket 200. Due to the spacing of the pivots 201 and 203, and the fact that the pivot 201 lies above the pivot 203, it will be apparent that movement of the shift lever 202 upon release of the pawl will enable the effective length of the connection rod 186 between the pivot 203 and the swivel block 190 to be varied. This provides for a manual furrow wheel adjustment in the steering differential mechanism. It will be noted that the shift lever 202 is in position to be grasped by the operator of the machine seated upon the tractor, so that variation in width of the furrow may be readily taken care of during drawing of the implement, for plowing purposes.

I have provided a plow stand comprising a supporting rod 210 adjustably connected by means 211 upon the tongue portion 33. The U bolt 211 enables the supporting rod 210 to be lowered so that the foot 212 thereof may engage the ground surface for supporting the forward end of the implement frame when detached from the tractor. The upper end of the rod 210 may be provided with a supporting arm 213, as shown, for supporting the hydraulic mechanism hose lines.

It will be apparent from the foregoing that an improved implement has been provided which while relatively simple in nature contains all of the adjustments necessary to perform efficient and successful plowing in soil of widely varying nature and under widely different plowing conditions. The draft connection is extremely simple and it is noted that the hitch linkage while vertically movable for raising and lowering the front end of the plow is not laterally movable as in some types of hitch linkage. Therefore, one of the important features of the invention is the fact that notwithstanding the linkage is not laterally movable, means has been provided for laterally shifting the angle of the furrow wheel for proper furrow width plowing during turning of the tractor.

Various changes in the shape, size and arrangement of parts may be made to the forms of the invention herein shown and described without departing from the spirit of the invention of the scope of the following claims.

I claim:

1. In an agricultural implement adapted to be drawn by tractors the combination of a main implement frame, an earth working implement mounted upon the main implement frame, a furrow wheel, a bracket rigidly and detachably connected with the rear end of said implement frame, a transverse substantially horizontal shaft rotatably supported upon said bracket, a lever fixedly connected directly upon said shaft and extending upwardly, a connecting rod pivotally connected to the lever spaced above said horizontal shaft, a bracket extension rigidly connected directly upon said horizontal shaft extending rearwardly transverse therefrom, a yoke pivotally connected upon said bracket extension upon an upright substantially vertical axis which is spaced rearwardly from the said horizontal shaft, and means rotatably supporting the furrow wheel upon the rear end of said yoke spaced rearwardly of said upright substantially vertical axis, a transverse lever arm fixedly connected to said yoke at a location spaced rearwardly of said upright substantially vertical axis, and a furrow wheel connecting rod pivotally connected upon the last mentioned lever spaced from its connection with said yoke and extending forwardly along the implement frame.

2. In an agricultural implement the combination of an elongated implement frame, an earth working implement mounted upon the frame intermediate the ends thereof, a depending bracket rigidly connected upon the rear end of the frame terminating at its lower end in an inverted U-shaped yoke, a horizontal shaft rotatably supported upon said U-shaped yoke, an upwardly extending lever rigidly connected to said shaft laterally of the yoke, a forwardly extending lifting control rod pivotally connected to the upper end of said lever for operating the same, a rearwardly extending U-shaped bracket yoke rigidly connected directly upon said horizontal shaft extending rearwardly therefrom, a vertical shaft rotatably pivoted upon the bracket yoke last mentioned, an elongated furrow wheel supporting yoke rigidly connected with said vertical shaft for movement therewith and extending rearwardly from said shaft, a furrow wheel, means rotatably mounting the furrow wheel upon the furrow wheel yoke at the rear end thereof, a laterally extending lever arm rigidly connected with said furrow wheel yoke at a location spaced between the vertical shaft and the rotatable connection of the furrow wheel upon said furrow wheel yoke, and a steering rod pivotally connected to the outer end of the arm and extending forwardly along the implement frame.

References Cited in the file of this patent

UNITED STATES PATENTS

| | | |
|---|---|---|
| 791,124 | Baehr | May 30, 1905 |
| 1,485,423 | McKay | Mar. 4, 1924 |
| 1,569,266 | Collier | Jan. 12, 1926 |
| 1,702,615 | Paul | Feb. 19, 1929 |
| 1,790,682 | Strandlund et al. | Feb. 3, 1931 |
| 2,314,041 | Gurries | Mar. 16, 1943 |
| 2,320,141 | Kott | May 25, 1943 |
| 2,322,342 | Bunn | June 22, 1943 |
| 2,324,870 | Orelind | July 20, 1943 |
| 2,341,807 | Olmstead et al. | Feb. 15, 1944 |
| 2,375,970 | Williams | May 15, 1945 |
| 2,416,194 | Miller | Feb. 18, 1947 |
| 2,555,554 | Miller | June 5, 1951 |
| 2,613,584 | Toland | Oct. 14, 1952 |
| 2,618,213 | Welcher et al. | Nov. 18, 1952 |
| 2,635,517 | Silver et al. | Apr. 21, 1953 |
| 2,704,496 | Taylor | Mar. 22, 1955 |